United States Patent [19]

Inoue et al.

[11] Patent Number: 4,748,458

[45] Date of Patent: May 31, 1988

[54] THERMAL ELECTROSTATIC INK-JET RECORDING APPARATUS

[75] Inventors: Nanao Inoue; Koichi Saito; Eiichi Akutsu; Yoshihiko Fujimura; Kiyoshi Horie, all of Kanagawa, Japan

[73] Assignee: Fuji Xerox Co., Ltd., Tokyo, Japan

[21] Appl. No.: 44,955

[22] Filed: May 1, 1987

[30] Foreign Application Priority Data

May 7, 1986 [JP] Japan ................................ 61-103133

[51] Int. Cl.$^4$ ................................ G01D 15/16

[52] U.S. Cl. ................................ 346/140 R; 346/75; 346/1.1; 400/126

[58] Field of Search .................... 346/1.1, 75, 140 PD, 346/140 R, 139 R, 153.1, 155, 159; 400/126

[56] References Cited

FOREIGN PATENT DOCUMENTS 0090775 5/1985 Japan ............................ 346/140 PD

*Primary Examiner*—E. A. Goldberg

*Assistant Examiner*—Huan H. Tran

*Attorney, Agent, or Firm*—Finnegan, Henderson, Farabow, Garrett and Dunner

[57] ABSTRACT

A thermal electrostatic ink-jet recording apparatus includes an orifice for storing and jetting ink. The orifice is formed between first and second plate members and a longitudinal array of heating elements is formed on one of the plate members and is covered by an insulating layer. An electrically conductive layer is formed either on the insulating layer or the other plate member and cooperates with a counter electrode supporting a recording medium to apply an electrostatic field to ink in the orifice. The electrically conductive layer includes a central portion that extends substantially to the egress of the orifice in the area where ink is contained in the orifice and peripheral portions on either side of the orifice that are not in contact with the ink and that are spaced substantially away from the egress of the orifice. The spacing of the peripheral portion away from the egress of the orifice prevents a gas discharge phenomenon that induces instability in ink jetting.

8 Claims, 3 Drawing Sheets

THERMAL ELECTROSTATIC INK-JET RECORDING APPARATUS

FIELD OF THE INVENTION

The present invention relates to a thermal electrostatic ink-jet recording head to be used in a thermal electrostatic ink-jet recording apparatus in which a picture is formed by ink droplets selectively emitted by the cooperative action of thermal energy and an electrostatic field.

BACKGROUND OF THE INVENTION

Non-impact recording methods have attracted favorable attention as a means for making a hard copy of electronic picture information because they make less noise in recording. An ink jet recording method in which regular paper can be used for recording and in which recording can be accomplished without carrying out any special processes, such as photographic fixing, has been regarded as a very useful recording method.

In a conventional ink jet recording method, a pressure pulse is applied to an ink containing member during recording to jet ink from an ink-jet opening or orifice of the member. It has, however, been difficult to build a small ink jet device to implement the conventional ink jet printing method. Also, in order to perform printing with acceptable density, mechanical scanning has been required for the ink jet device. Consequently, the speed of the conventional ink jet method has been greatly limited.

Recently, several techniques, such as a magnetic ink jet method, a plane ink jet method, and a thermal bubble ink jet method, have been proposed to eliminate the aforementioned problems in order to make high-speed ink jet printing possible. In the magnetic ink jet method, a magnetic field is applied to magnetic ink provided in the vicinity of a magnetic electrode array to produce a meniscus in the surface of the magnetic ink and to record with a given pel density. An electrostatic field is applied to the magnetic ink to jet droplets of the magnetic ink. The magnetic ink jet method, however, has a disadvantage in that variable color imaging becomes difficult because of the coloration of magnetic powder contained in the ink.

In the plane ink jet method, ink disposed in a slit-like ink reservoir parallel to an electrode array is caused to jet in accordance with an electric field pattern formed between the electrode array and an array of opposite electrode. A recording paper is interposed between the two arrays. Although the plane ink jet method has an advantage in that a small orifice is not required and, therefore, the problem of orifice blockage due to the drying of ink in the orifice is avoided. The method has a disadvantage, however, in that a high voltage is required for causing the ink to jet. It is necessary to use time-division driving of the electrode array in order to prevent voltage leakage between adjacent electrodes. As a result, the plane ink jet method is not suitable for high-speed ink jetting.

In the thermal bubble jet method, ink is subject to thermal energy and is rapidly heated to produce surface boiling. Consequently, bubbles are formed within an orifice to jet the ink due to the increase of pressure within the orifice. In the thermal bubble jet method, it is necessary to raise the temperature of an exothermic material rapidly to cause surface boiling. Accordingly, the method has a practical disadvantage in that thermal transmutation of ink and thermal degradation of a layer for protecting an exothermic resistor provided as a heating means often occur.

In order to improve the recording speed of conventional ink jet methods and to avoid the disadvantages of the aforementioned ink jet methods, a so-called thermal electrostatic ink jet method has been proposed. In this method, a thermal signal is applied to the ink, and simultaneously or successively an electrostatic field is applied to the ink to jet the ink at the heated locations thereof.

The thermal electrostatic ink jet recording head used in the thermal electrostatic ink jet method comprises exothermic materials (or exothermic elements) for applying thermal energy to ink, an electrostatic induction electrode electrically connected to the ink to apply electrostatic energy to the ink, and means for feeding and holding the ink to and at an ink orifice to facilitate jetting of the ink due to the electrostatic power.

Specifically, the recording head includes a slit-like space formed between a first plate member formed on an insulating substrate and a second plate member. The first plate member may be formed by an exothermic resistor array composed of a plurality of exothermic resistors. The second plate member is disposed opposite to the first plate member and is separated therefrom by slit-like space having a predetermined width. The ink is fed into the slit-like space and held by pressure members, such as a pump, or the like to feed and hold ink within the slit-like space. In the head, the electrostatic induction electrode is provided on one of the first and second plate members.

The present inventors have found that when a voltage is applied across an electrically conductive layer or electrode for inducing an electrostatic field and an electrically-conductive layer or counter electrode with a recording medium interposed therebetween, gas discharge occurs between the electrostatic field induction electrode and the counter electrode at ink free locations on the ink-jet side end portion of the head formed by the two plate members. The gas discharge phenomenon causes problems in that stable ink jetting is prevented and safe operation is more difficult.

OBJECTS AND SUMMARY OF THE INVENTION

It is an object of the present invention to solve the above problems in the prior art.

Another object of the present invention is a thermal electrostatic ink-jet recording head having improved stability of ink jetting and enhanced safety in operation.

The above objects and other objects of the present invention are accomplished by a thermal electrostatic ink-jet recording apparatus comprising a first plate member having a first longitudinal edge, a second plate member in spaced opposition with respect to the first plate member and having a second longitudinal edge, the first and second edges and the first and second plate members defining an orifice adapted to contain and jet ink, a longitudinal array of spaced-apart heating elements formed on the first plate member and being adapted to locally heat ink in the orifice, an insulating layer formed over the array of heating elements, and an electrically conductive layer formed over the insulating layer, the electrically conductive layer having a central portion extending substantially to the first edge in the area of the orifice and a peripheral portion on each side of the central portion, the peripheral portion being spaced away from the first edge.

Alternatively, the electrically conductive layer may be formed on the second plate member and not on the insulating layer. In such case, the central portion of the electrically conductive layer extends substantially to the second edge in the area of the orifice and the peripheral portion on each side of the central portion is spaced apart from the second edge.

BRIEF DESCRIPTION OF THE DRAWINGS

The manner by which the above and other objects, features, and advantages of the present invention are achieved and the construction and operation of the invention itself will be fully apparent upon reading the following detailed description in view of the drawings, in which.

DETAILED DESCRIPTION OF THE PREFERRED EMBODIMENT

The thermal electrostatic recording head according to the invention has a slit-like ink reservoir defined by two plate members. In order to eliminate the occurrence of the aforementioned gas discharge phenomenon, an electrically conductive layer provided on an inner wall of a selected one of the plate members is formed so that an orifice-side end thereof is relatively far away from the orifice at a portion where ink is absent compared with the other portion where ink is present. Preferably, in the case where the two functions of heating ink and jetting ink are accomplished by a selected one of the two plate members of the recording head, an exothermic resistor layer, a feedback electrode layer, an insulating layer, and the electrically-conductive layer are successively laminated on the selected plate member.

On the contrary, in the case where the two functions are shared between the two plate members, an exothermic resistor layer, a feedback electrode layer, and an insulating layer are successively formed on one of the plate members while only the electrically conductive layer is provided on the other plate member.

To perform thermal electrostatic ink-jet recording by use of the recording head constructed as described above, ink is supplied into the ink reservoir and an electric signal corresponding to picture information is selectively applied to the exothermic elements. Simultaneously or successively, an electrostatic field is generated between the electrically-conductive layer and the counter electrode to cause a heated part of the ink to jet to the recording medium without occurrence of gas discharge.

The use of the electrically conductive layer formed as described above makes it possible to provide an electrostatic ink-jet recording head having stability in ink jetting as well as increased safety in operation.

Figure 2:
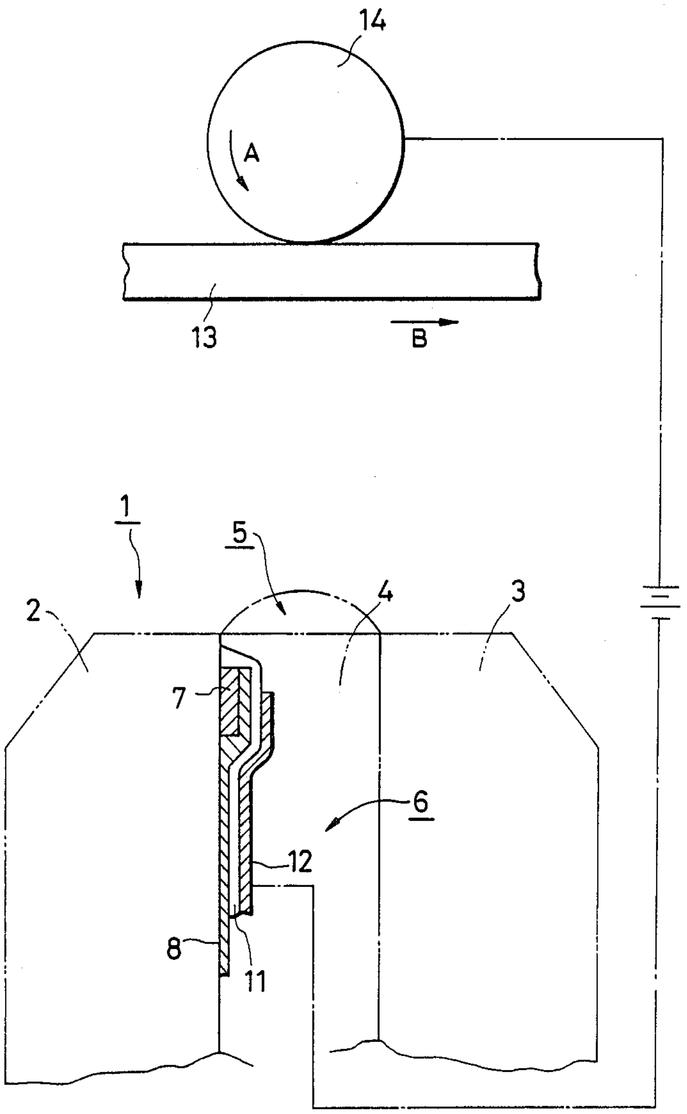
FIG. 2 is a front view in vertical section of an exothermic resistor layer of the above-mentioned recording head.

In FIG. 2, a recording head 1 is arranged such that two plate members 2 and 3 are disposed opposite to each other at a suitable distance and are closed at their ends by a pair of wall plates 4 to form a slit-like ink reservoir having an ink-jet orifice 5 at its upper portion.

Figure 3:
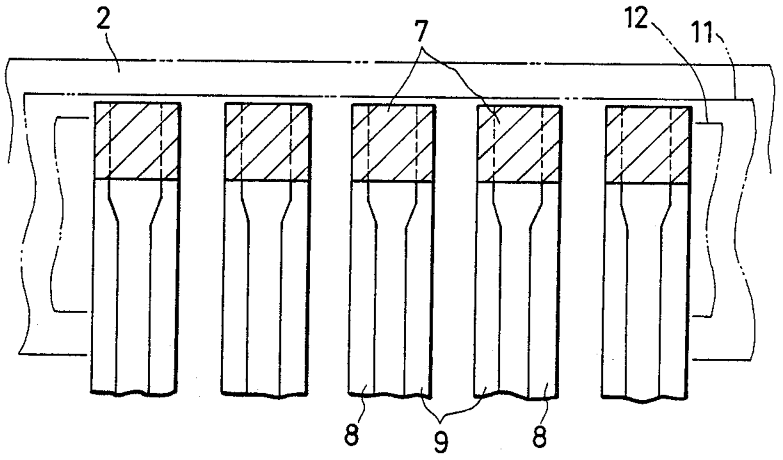
FIG. 3 is a side view in vertical section of the above-mentioned recording head.

An insulating substrate (not shown) is provided at the inner surface of either one of the two plate members 2 and 3, for example, at the inner surface of the plate member 2. As shown in FIG. 3, a plurality of exothermic resistors 7 are disposed on the insulating substrate side by side in the longitudinal direction of the ink-jet orifice 5.

Pairs of return circuit electrodes 8 and 9 corresponding to the respective exothermic resistors 7 are provided on the insulating layer such that the return circuit electrodes 8 and 9 of each pair are connected to the opposite ends of a corresponding one of the exothermic resistors 7. An insulating layer 11 and an electrically conductive layer 12 are successively laminated on the return circuit electrodes 8 and 9.

As also shown in FIG. 2, a counter electrode 14 is disposed in opposition to the ink-jet orifice 5 of the recording head 1 with a recording medium 13 being disposed therebetween such that when the counter electrode 14 rotates in the direction of the arrow A the recording medium 13 is fed in the direction of the arrow B. The electrically conductive layer 12 and the counter electrode 14 are electrically coupled to each other through a power source so that an electrostatic field can be generated when a voltage is applied across the electrically conductive layer 12 and the counter electrode 14.

The exothermic resistors 7 may be formed through a process wherein a 300Å tantalum nitride film is formed through reactive sputtering, and then is divided into parts 7 corresponding to dot-recording areas as shown in FIG. 3 through photolithographic etching. The respective exothermic resistors 7 may be selected to have a size of about 110 $\mu$m$\times$70 $\mu$m and resistance of about 180 ohms.

The electrodes 8 and 9 may be formed by successively and uniformly depositing nickel-chromium of about 500Å thick and gold of about 10000Å thick through evaporation, and then using photolithographic etching. The insulating layer 11 may be formed by forming a silicon dioxide film of about 2 $\mu$m through RF sputtering.

The electrically conductive layer 12 for electrostatic induction may be formed by successively depositing through evaporation a chromium film about 500Å thick, a copper film about 10000Å thick, and a second chromium film about 500Å thick, and then performing photolithographic etching. In the electrically conductive layer 12, the first chromium layer is provided to make the silicon dioxide and copper be in close contact to each other, and the third chromium layer is provided as an antioxidant film.

Figure 1:
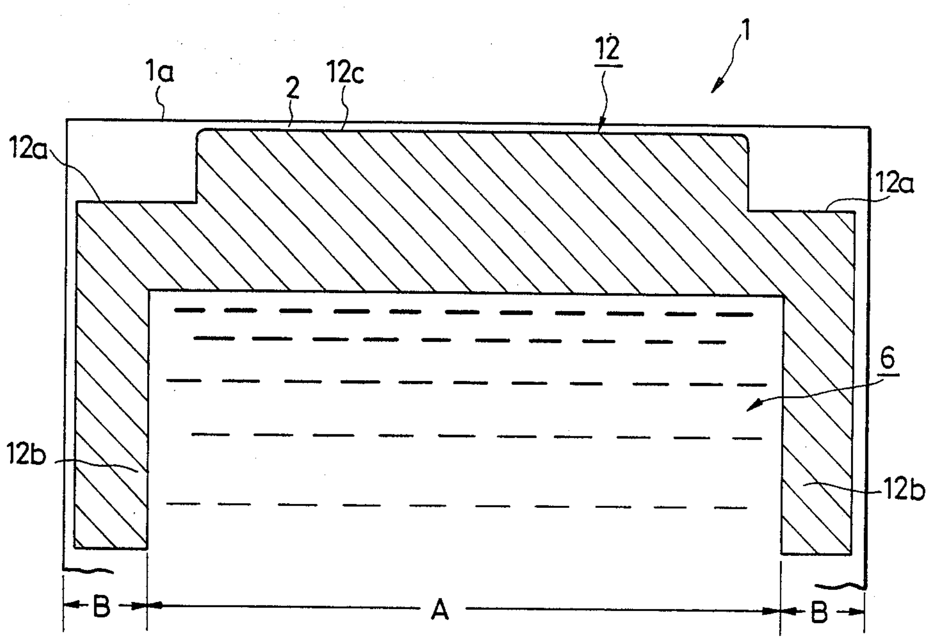
FIG. 1 is a front view in vertical section of an electrically conductive layer of an embodiment of the electrostatic ink-jet recording head according to the present invention.

As shown in FIG. 1, the recording head 1 has an area A where ink is present and another area B there no ink is present. End portions 12*a* of the electrically conductive layer 12 at the sides of the ink-jet orifice 5 in the ink-absent area B are formed as notches of about 1 mm with respect to the center portion 12*c* located near the ink-present area A. The ink-absent area B is used for adhesion to the opposite plate member 3 and to provide the return circuit electrode 12*b*.

The thermal electrostatic ink-jet recording head 1 according to the present invention, enables picture recording in a manner as follows. Selected areas of the ink corresponding to picture information is instantaneously heated to about 300° C., so that the physical properties of the ink, such as viscosity, surface tension, electric conductivity, and the like, are rapidly changed. During these changes in the physical properties of the ink, a voltage is applied across the counter electrode 14 and the electrically conductive layer 12 of the recording head 1 to apply an electrostatic field therebetween to cause the heated areas of the ink to jet from the ink-jet orifice 5. The distance between the counter electrode 14 and an orifice-side end surface *1a* of the recording head 1 is set to about 300 μm. Energy applied to the exothermic resistors 7 is about 0.4 W for 0.7 msec.

As described above, the end portions 12*a* of the electrically conductive layer 12 at the ink-absent locations are formed as notches with respect to the center portion 12*c* of the layer 12 at the ink-present area. Accordingly, the electrostatic field applied between the end portion 12*a* and the counter electrode 14 disposed opposite to the end portion 12*a* through the recording medium 13 is significantly weakened to make it possible to prevent gas discharge from being generated at the locations between the end portion 12*b* and the counter electrode 14 and, more particularly, to prevent degradation of the picture due to gas discharge.

Figure 4:
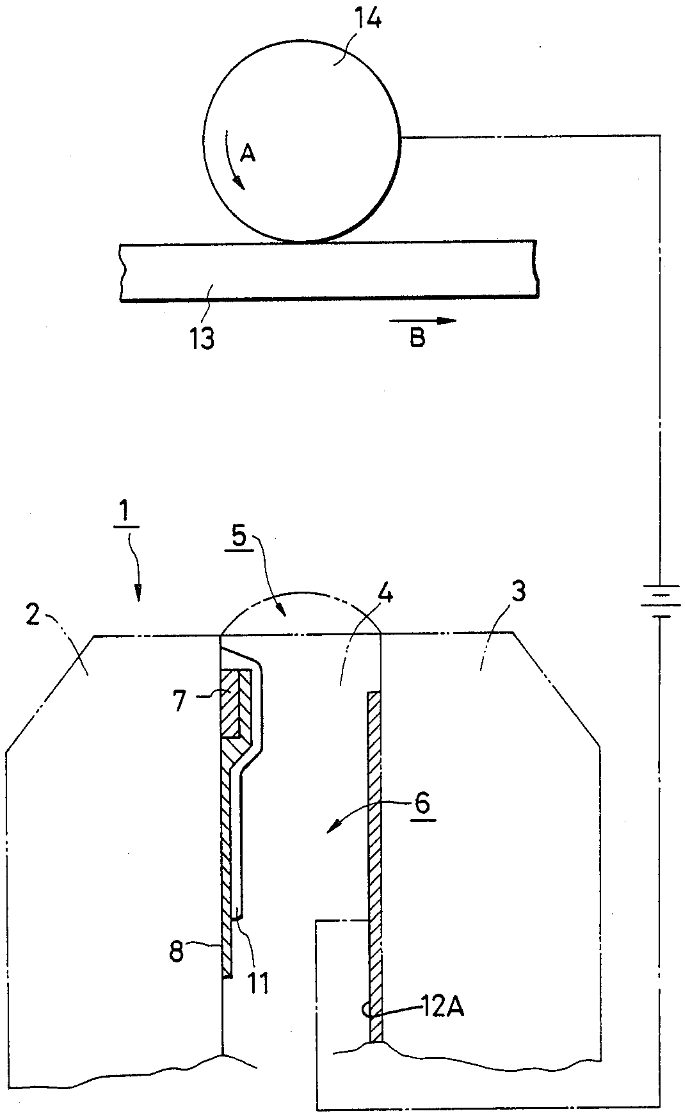
FIG. 4 is a front view in vertical section showing a second embodiment of the recording head of FIG. 2.

Although the embodiment has shown the case where the two functions of heating the ink and inducing electrostatic energy to jet ink are assigned to only one of the two plate members, the invention is applicable to the case where an electrically conductive layer 12A is provided on the plate member 3 as shown in FIG. 4 to thereby share the two functions between the plate members 2 and 3.

Although the embodiment has shown the case where the electrically conductive layer 12 is formed through photolithographic etching, the invention is also applicable to the case where the electrically conductive layer is deposited through masking evaporation so as to obtain a finer and more precise pattern.

According to the present invention, the ink jet orifice-side end portion of the electrically conductive layer provided at the inner surface of a selected one of the opposite two plate members is formed such that the end portion of the electrically conductive layer at the ink-absent area is lowered by notches with respect to the remaining or central portion of the same member at the ink-present area. This prevents gas discharge from being generated between the end portion of the electrically conductive layer at the ink-absent area and the counter electrode and therefore prevents the degradation of picture quality and operation safety due to gas discharge.

What is claimed is:

1. An ink jet recording apparatus for applying both electric energy and thermal energy to a liquid coloring agent to thereby jet said liquid coloring agent toward a counter electrode provided for supporting a recording medium, comprising:

(a) means for containing said liquid coloring agent, said containing means comprising a pair of spaced apart, opposing plate members, each having an inner surface and at least one edge, said edges of said plate members defining an orifice portion for jetting said liquid coloring agent through said orifice portion;

(b) thermal energy applying means for heating said liquid coloring agent contained in said containing means, said thermal energy applying means comprising a plurality of heating elements arrayed on an inner surface of one of said plate members; and (c) electrostatic energy applying means for applying an electric field to said liquid coloring agent contained in said containing means, said electric energy applying means comprising a counter electrode and an electrically conductive layer provided on one of said plate members, said electrically conductive layer having a central portion where said liquid coloring agent is present and having a peripheral portion where said liquid coloring agent is absent, said central portion extending substantially to said orifice portion, said peripheral portion being spaced away from said orifice portion.

2. An ink-jet recording apparatus according to claim 1, wherein each of said heating elements comprises an exothermic resistor.

3. An ink-jet recording apparatus according to claim 2, further comprising a lead pair associated with each of said resistors, said lead pair including first and second electrodes separately connected with said associated resistor and being adapted to supply voltage to said resistor.

4. An ink-jet recording apparatus according to claim 3, further comprising an insulating layer formed over said heating elements.

5. An ink-jet recording apparatus according to claim 3, wherein said electrically conductive layer comprises a first chromium layer, on said plate member, a copper layer on said first chromium layer, and a second chromium layer on said copper layer.

6. An ink-jet recording apparatus according to claim 1, wherein said counter electrode is adapted to support a recording medium proximate said orifice portion and further including a voltage source for establishing a potential between said electrically conductive layer and said counter electrode to apply an electrostatic field to liquid coloring agent adjacent said orifice portion.

7. An ink-jet recording apparatus according to claim 4, wherein said electrically conductive layer is formed on said insulating layer.

8. An ink-jet recording apparatus according to claim 4, wherein said electrically conductive layer is positioned on the other of said plate numbers opposite the plate member provided with said heating elements.

* * * * *